July 8, 1952 A. J. JOHNSON 2,602,277
LAWN TRIMMING ATTACHMENT FOR LAWN MOWERS
Filed Aug. 20, 1948 2 SHEETS—SHEET 2

Arthur J. Johnson
INVENTOR.

BY *Clarence A. O'Brien*
*and Harvey B. Jacobson*
Attorneys

Patented July 8, 1952

2,602,277

UNITED STATES PATENT OFFICE 2,602,277

LAWN TRIMMING ATTACHMENT FOR LAWN MOWERS

Arthur J. Johnson, New Orleans, La.

Application August 20, 1948, Serial No. 45,293

3 Claims. (Cl. 56—25.4)

This invention relates to new and useful improvements in lawn trimmers and the primary object of the present invention is to provide a lawn trimming attachment for power operated lawn mowers.

Another important object of the present invention is to provide an attachment for power driven lawn mowers including a rotary lawn trimming blade and embodying novel and improved means for operatively connecting the blade to a driving part of the lawn mower so that the blade will rotate and precede the cutting blade of the lawn mower.

A further object of the present invention is to provide a lawn trimmer attachment for lawn mowers including a trimming blade supporting frame, and a novel and improved adjustable, wheeled support for the frame for selectively adjusting the trimming blade relative to the edge of a lawn that is to be trimmed.

A still further aim of the present invention is to provide a lawn trimmer for power operated lawn mowers that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
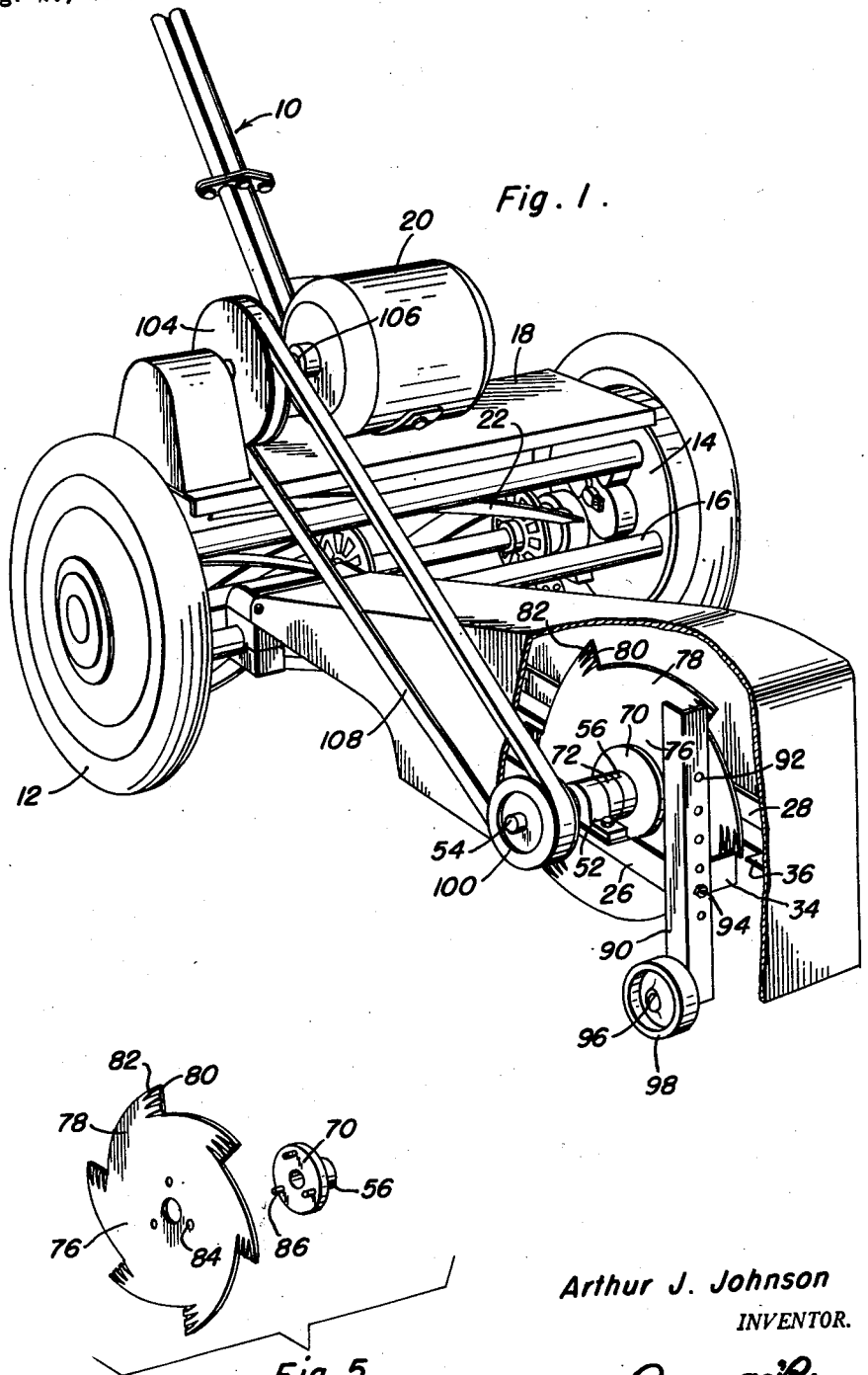
Figure 1 is a perspective view of the present invention and showing the same applied to a lawn mower, and with parts broken away.
Figure 2:
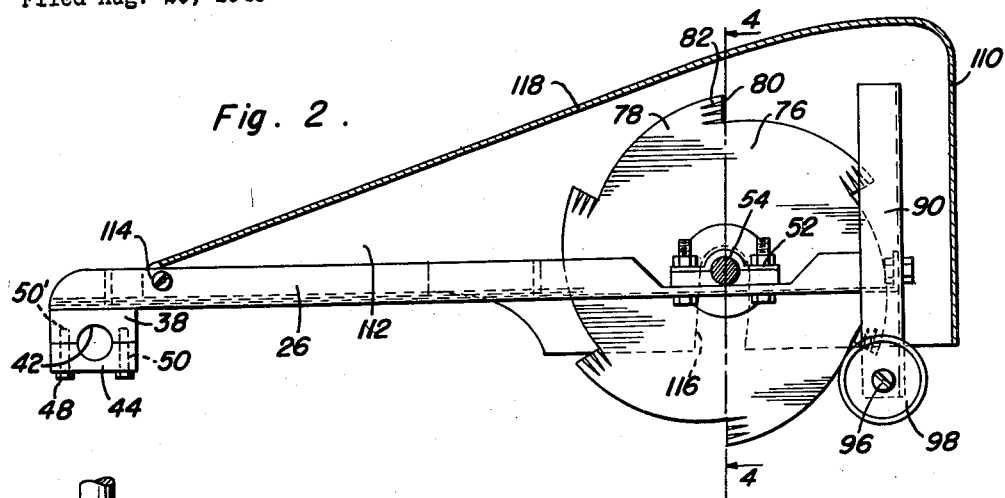
Figure 2 is a side elevational view of the present invention, and with parts of the housing in section and broken away for convenience of explanation.

Referring now to the drawings in detail, wherein for the purpose of illustration, there is disclosed a preferred embodiment of the present invention, the numeral 10 represents a power operated lawn mower generally including a pair of spaced wheels 12 and side members 14.

The side members 14 are connected by one or more cross members 16 and a support 18 is suitably mounted relative to the side members 14 and cross members 16 and supports an electric or fuel operated motor 20 of any suitable size or shape that is operatively connected to the cutter 22 of the mower for driving or rotating the said cutter.

The numeral 24 represents the frame that is used in conjunction with the present invention generally, including a pair of spaced parallel, preferably angle iron members 26 and 28 the rear or inner ends of which are connected by a cross strap 30.

Figure 3:
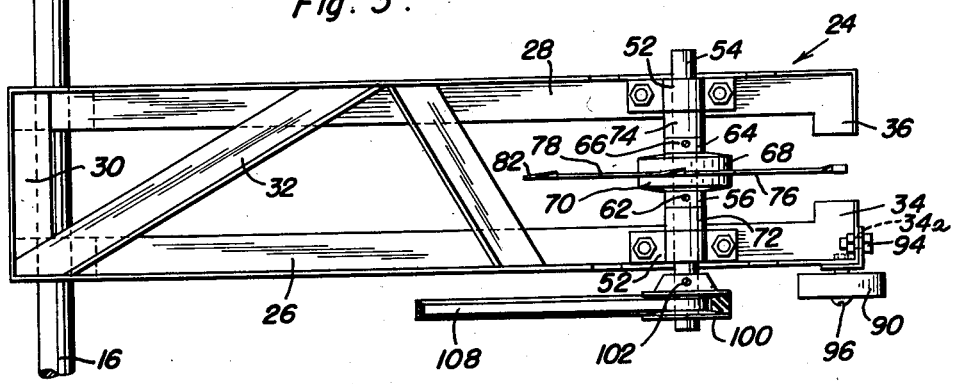
Figure 3 is a fragmentary top plan view of the present invention, the housing removed therefrom, and showing the same applied to the cross member of the lawn mower.
Figure 4:
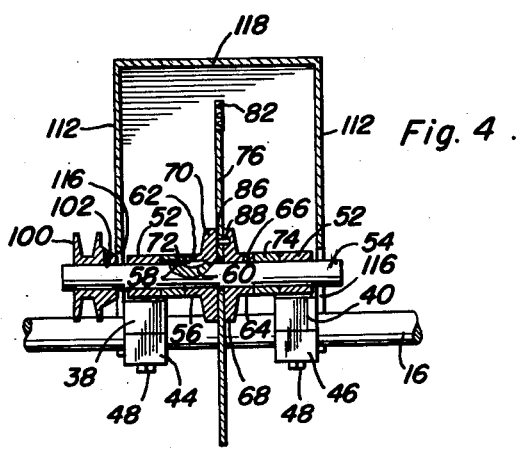
Figure 4 is a transverse vertical sectional view taken substantially on the plane of section line 4—4 of Figure 2; and, Figure 5 is a group perspective view of the trimming blade and the means for locking the same to the driven shaft, in accordance with the present invention and looking from the rear of Figure 1.

The members 26 and 28 are braced to each other by any suitable number of bracing strips 32 of preferably angle iron construction and the forward ends of the members 26 and 28 are provided with inwardly extending projections 34 and 36 which are spaced relative to each other, as shown best in Figure 3 of the drawings.

Depending from and suitably fixed to the rear ends of the members 26 and 28, is a pair of blocks 38 and 40 having concaved recesses 42 that receive the upper periphery of one of the cross members 16. Complementary blocks 44 and 46 are adjustably connected to the blocks 38 and 40 by fasteners or bolts 48 that extend upwardly through openings 50 in the blocks 44 and 46, and which bolts 48 receivably engage internally threaded openings 50' provided in the blocks 38 and 40. By adjusting the fasteners 48, the frame 24 will be disposed at a selected position on the cross member 16 for use in trimming lawns and the like at a predetermined distance from a selected one of the wheels 12.

Suitable bearings 52 are detachably secured to the side members 26 and 28, adjacent the projections 34 and 36 and rotatably support a driven shaft 54 on which there is engaged a collar 56 having a recess in its inner periphery that receives a semi-cylindrical key 58. The key 58 is received in a recess 60 in the shaft 54 and a set screw 62 adjustably carried by the collar 56 controls the key 58 so that the collar 56 will rotate with the shaft 54.

A further collar 64 embraces the shaft 54 and is held thereto by a set screw 66 that is countersunk into the shaft 54. The collar 64 is provided with an enlarged head portion 68 that is spaced from the enlarged head portion 70 of the collar 64, and spacing sleeves 72 and 74 are disposed between the collars 56 and 64 and bearings 52.

Loosely received on the shaft 54, is a vertically rotating disc-type trimming blade or cutting element 76 having a plurality of circumferentially spaced arcuate projections 78. The straight edges 80 of the projections 78 are provided with slots forming cutting or trimming teeth 82 which taper outwardly in the same direction as shown best in Figure 3 of the drawings.

The central portion of the blade 76 is provided with a plurality of circumferentially spaced openings 84 that receive lugs 86 projecting from the head portion 70 of the collar 56. Recesses 88 are provided in the head portion 68 of the collar 64 and also receive the lugs 86 to lock the blade 76 between the head portions of the said collars.

An angle iron member 90 is provided with a plurality of longitudinally spaced openings 92 one of which opposes an opening 34a in the upstanding leg of the projection 34. A fastener 94, such as a bolt and nut, extends through a selected one of the openings 92 and the opening 34a provided in the projection 34 for vertical adjustment of the member 90.

An axle or bolt 96 carried by the member 90 rotatably supports a suitable wheel 98 that is adjustable with the member 90 and which permits the frame to be wheeled or moved together with the lawn mower 10.

A pulley 100 is secured to the shaft 54 by a set screw or the like 102 and is connected to a drive pulley 104 mounted on the drive shaft 106 of the motor 20 by an endless belt 108. It should be noted, that any suitable means may be employed for operatively connecting the shafts 54 and 106.

The numeral 110 represents a housing or casing having a pair of side walls 112 which are pivoted as at 114 to the members 26 and 28 so that the same may be raised for accessibility to the blade 76. The side walls 112 are notched as at 116 to receive the shaft 54 and the upper wall 118 of the housing 110 inclines downwardly and rearwardly to form a shield or deflector for grass or the like that is cut by the blade 76.

In practical use of the present invention, the blocks 38, 40, 44 and 46 are adjusted along the cross member or bar 16 by tightening the bolts 48 so that the blade 76 will be spaced parallel to one wheel 12 of the lawn mower 10, and at a predetermined distance therefrom.

The blade 76 will be rotated simultaneously with the cutter blade 22 of the lawn mower and will precede the cutter blade 22.

By adjusting the member or support 90, the blade 76 will be selectively raised or lowered to gauge the blade 76 relative to the edge of a lawn that is to be trimmed.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An attachment for lawn mowers having a cutter, a cross member spaced parallel to and disposed forwardly of the cutter and a power driven shaft, said attachment comprising, an elongated frame, means adjustably and slidably securing one end of said frame to said cross member, a casing embracing and supported by said frame, a driven horizontal shaft journaled for rotation on said frame, a driving connection between said driven shafts, a vertically rotating trimming blade carried by said last mentioned driven shaft, and a wheeled support adjustably mounted on said frame.

2. In a lawn mower including a pair of side members, a cutter journaled for rotation on the side members, a cross member spaced parallel to and disposed forwardly of the cutter, the ends of said cross member being secured to said side members, a support mounted on said side members and overlying the cutter and a source of power mounted on said support; the improvement of which comprises an elongated frame having forward and rear end portions, means slidably and adjustably securing the rear end portion of said frame to said cross member, a horizontally disposed driven shaft journaled on the forward end portion of said frame, a vertically rotating disk type cutting element mounted on said driven shaft, a driving connection between said driven shaft and said source of power, a shield mounted on said frame and housing said cutting element, a vertical support adjustably secured to the forward end portion of said frame and spaced from said cutting element, and a wheel on said vertical support.

3. A lawn edge trimmer comprising an elongated substantially rectangular frame including a pair of side members and forward and rear end members, a pair of bearings mounted on said side members adjacent said forward end member, a horizontally disposed driven shaft journaled for rotation in said bearings, a vertically rotating disk type blade mounted on said shaft for rotation therewith, said forward end member having an opening therein receiving said blade, means on the rear end member for attaching the frame to a lawn mower, a vertically disposed angle iron support receiving one corner of said frame and having first and second vertical flanges, said first flange bearing against one end of said forward end member and said second flange bearing against the forward end of one of said side members to retain the support perpendicular to the frame, fastening means securing said support to said forward end member, and a vertically rotatable wheel journaled on the lower end of said support.

ARTHUR J. JOHNSON.

REFERENCES CITED

The following references are of record in the file of this patent:

UNITED STATES PATENTS

| Number | Name | Date |
| --- | --- | --- |
| 1,238,595 | Sundhohn | Aug. 28, 1917 |
| 2,034,505 | Cline | Mar. 17, 1936 |
| 2,172,786 | Bishir | Sept. 12, 1939 |
| 2,185,659 | Chernow | Jan. 2, 1940 |
| 2,190,578 | Todd | Feb. 13, 1940 |
| 2,193,712 | Campbell | Mar. 12, 1940 |
| 2,514,593 | Velotta | July 11, 1950 |

FOREIGN PATENTS

| Number | Country | Date |
| --- | --- | --- |
| 26,863 | Great Britain | 1907 |
| 399,728 | Great Britain | Oct. 12, 1933 |